US006303667B1

(12) United States Patent
Kruecke

(10) Patent No.: US 6,303,667 B1
(45) Date of Patent: *Oct. 16, 2001

(54) FOAMING AGENTS CONTAINING LIQUID CARBON DIOXIDE

(75) Inventor: Werner Kruecke, Hannover (DE)

(73) Assignee: Solvay Fluor und Derivate, Hannover (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/836,279

(22) PCT Filed: Oct. 20, 1995

(86) PCT No.: PCT/EP95/04122

§ 371 Date: May 2, 1997

§ 102(e) Date: May 2, 1997

(87) PCT Pub. No.: WO96/14354

PCT Pub. Date: May 17, 1996

(30) Foreign Application Priority Data

Nov. 2, 1994 (DE) .................................. 44 39 082
Jan. 28, 1995 (DE) .............................. 195 02 708

(51) Int. Cl.$^7$ .............................. C08G 18/00; C08J 09/14
(52) U.S. Cl. ..................... 521/131; 521/133; 521/910; 521/917; 252/67; 252/367; 239/337; 264/53
(58) Field of Search ..................... 521/133, 131, 521/910, 917; 252/364, 67; 239/337; 264/53

(56) References Cited

U.S. PATENT DOCUMENTS

| 3,184,419 | * | 5/1965 | Merriman | 521/133 |
| 3,673,128 | * | 6/1972 | Hayash | 521/131 |
| 4,337,318 | | 6/1982 | Doyle | 521/917 |
| 4,464,484 | | 8/1984 | Yoshimura et al. | 521/58 |
| 4,626,376 | | 12/1986 | Pean | 252/305 |
| 5,081,162 | | 1/1992 | Farkas et al. | 521/133 |
| 5,120,770 | * | 6/1992 | Doyle et al. | 521/99 |
| 5,182,308 | | 1/1993 | Voelker et al. | 521/79 |
| 5,286,757 | * | 2/1994 | Smith et al. | 521/87 |
| 5,304,320 | * | 4/1994 | Barthelemy et al. | 252/67 |
| 5,312,847 | * | 5/1994 | de Vos | 521/137 |
| 5,348,984 | | 9/1994 | Lee | 521/79 |
| 5,496,866 | * | 3/1996 | Sommerfeld | 521/131 |
| 5,823,669 | * | 10/1998 | Jones | 366/132 |

FOREIGN PATENT DOCUMENTS

| 3923913 A1 | 2/1991 | (DE) . |
| 4025843 A1 | 2/1992 | (DE) . |
| 0113903 A2 | 7/1984 | (EP) . |
| 155876 | 9/1985 | (EP) . |
| 0464581 A2 | 1/1992 | (EP) . |
| 51-123274 | 10/1976 | (JP) . |
| 52-117957 | 10/1977 | (JP) . |
| WO 91/12287 | 8/1991 | (WO) . |
| WO 94/17133 | 8/1994 | (WO) . |

OTHER PUBLICATIONS

Saunders & Fresch; Polyurethanes; Part II; p. 217, 1964.*
Abstract of Published Japanese Patent Application No. JP 52–117957; 1977.
Abstract of Published Japanese Patent Application No. JP 01–254,742; 1989.
Huber et al., "Alternate Blowing Agents in PMDI and TDI Appliance Foams", *Journal of Cellular Plastics*, vol. 27, No. 2, Mar./Apr. 1991, pp. 192–205.
C. Fiorentini et al., "Latest Manufacturing Solutions for Slabstock Foams," Proceedings 35th Annual Polyurethane Technical/Marketing Conference, Oct. 9–12, 1994, pp. 12–16.

* cited by examiner

*Primary Examiner*—Rachel Gorr
(74) *Attorney, Agent, or Firm*—Crowell & Moring, L.L.P.

(57) ABSTRACT

A blowing agent composition includes a blowing agent consisting of liquified carbon dioxide and 1,1-difluoroethane, or a mixture consisting of liquid carbon dioxide and at least one other liquid or pressure-liquified component selected from the group consisting of ethers with a total of 2 to 4 carbon atoms; ketones with 3 to 5 carbon atoms; alcohols with 1 to 5 carbon atoms; aliphatic hydrocarbons selected from the group consisting of propane, butane, pentane, hexane, heptane; cyclic hydrocarbons with 3 to 12 carbon atoms; fluorohydrocarbons selected from the group consisting of trifluoromethane, 1,1,1-trifluoroethane, 1,1,2-trifluoroethane, 1,1,2,2-tetrafluoroethane, 1,1,1,2-tetrafluoroethane, 1,1,1,3,3-pentafluoropropane and 1,1,1,3,3-pentafluorobutane; phosphate esters and phosphonate esters containing three C1–C4-alkyl groups optionally substituted by one or more halogen atoms. The composition comprises 5 to 50% by weight of liquid carbon dioxide.

18 Claims, No Drawings

FOAMING AGENTS CONTAINING LIQUID CARBON DIOXIDE

The invention relates to blowing agents, containing liquid carbon dioxide, as well as to their use in methods for producing foamed plastics.

The invention also relates to blowing agent compositions, which are suitable for the production of 1-component or multi-component polyurethane foams from pressure vessels.

The use of chlorofluorohydrocarbons (CFHCs) as blowing agents for the production of foamed plastics is no longer desirable for ecological reasons. Gaseous substances, such as carbon dioxide, have also been proposed as substitutes. However, as a gaseous, physical blowing agent, carbon dioxide has the disadvantage that, because of its relatively low critical temperature, it can be metered out only with difficulty under the conditions existing during production. Furthermore, the use of carbon dioxide according to previously known methods usually leads to open-celled foams with an undesirably high water-absorption capacity and frequently still unsatisfactory heat insulation properties. Until now, the production of foamed plastics with predominantly closed cells also has been associated with difficulties when carbon dioxide was used as the only blowing agent or as a co-blowing agent in combination with other physical blowing agents.

One-component or multi-component polyurethane foams, which are dispensed from a pressure vessel, such as a spray can, are used mainly in building construction or automobile production for filling cavities or interstices with foam. In so-called 1-component polyurethane foams (referred to hereinafter as 1K-PUR-Foam), a polyol premix is reacted with an excess of diisocyanate and/or polyisocyanate in the presence of a catalyst and optionally further auxiliary materials and additives in a pressure vessel to form a prepolymer containing isocyanate groups. By actuating the spray valve of the pressure vessel, the prepolymer is forced out of the can by a blowing agent. At the same time, a spontaneous foaming of the prepolymer occurs. By reaction of the remaining isocyanate groups with the moisture in the air, a substantially closed-cell, rigid foam is formed.

In a 2-component polyurethane foam (referred to hereinafter as a 2K-PUR-Foam), an additional component having hydroxy groups, such as a polyol, which is first added just before the foaming operation, is required for curing the prepolymer foam. Usually, this polyol is located in the pressure vessel in a space, which is separated from the remaining components and is first added to the prepolymer component only immediately before it emerges from the pressure vessel when the spray valve is actuated.

Most of the prepolymers used for polyurethane foams to be dispensed from pressure vessels, have a very high viscosity, so that the blowing agent used must have good solvent properties, in order to be able to foam the components without difficulty from the pressure vessel. The use of chlorofluorohydrocarbons (CFHCs) as blowing agents for such applications is no longer desirable for ecological reasons. Many of the previously proposed substitute materials have disadvantages in use, such as a still unsatisfactory heat insulation or an evaporation rate which is too low.

The international patent application WO 91/12287 discloses that liquefied $CO_2$ can be used with co-blowing agents, for example water or higher boiling sovents. In this manner a controlled pre- and post-expansion of the foam can be achieved.

The Japanese patent application JP-A 1/254 742 discloses that polyethylene resins can be foamed with a mixture of $CO_2$ and a readily volatile organic blowing agent.

The international patent application WO 91/08243 relates to the production of open-pored polyurethane foams. Preferably, liquified $CO_2$, which additionally may contain small amounts of water or other blowing agents, is used as the blowing agent.

It was therefore an object of the invention to make available new methods for the production of foamed plastics and also for the generation of polyurethane foams from pressure containers, which overcome the disadvantages of the prior art. It was a further object of the invention to make new blowing agent compositions available for these methods.

Surprisingly, it has now been found that compositions, which contain carbon dioxide in liquid form in addition to at least one other liquid component, are suitable as blowing agent compositions in methods for the production of foamed plastics. Blowing agent compositions, which contain liquefied carbon dioxide, are also suitable for producing polyurethane foams from pressurized containers.

The invention relates to blowing agent compositions which contain 0.5 to 50% by weight of liquid $CO_2$. Preferred blowing agent compositions contain 5 to 50% by weight of liquid carbon dioxide, particularly 10 to 50% by weight.

In addition to liquid carbon dioxide, at least one other liquid component or pressure-liquefiable component is contained. The other liquid component or components preferably represents or represent the remainder up to 100% by weight of the blowing agent composition. The liquid component or components may, for example, be liquid or pressure-liquefied physical blowing agents and/or liquid flame retardants selected, for example, from the group of phosphate esters or phosphonic acid esters. In addition, known additives or auxiliaries, such as stabilizers or plasticizers, may also be contained.

The invention further relates to a method for the production of foamed plastics with the aid of blowing agents, in which a liquid blowing agent composition is used, which contains 0.5 to 50% by weight, preferably 5 to 50% by weight, particularly 10 to 50 wt.-%, and especially 10 to 20% by weight of liquefied carbon dioxide.

Liquefied carbon dioxide as used in this invention can be obtained by any of the known methods of liquefying gases, preferably by pressure liquefaction.

At room temperature and atmospheric pressure ($1.01325 \times 10^5$ Pa), carbon dioxide is a colorless gas, which can be pressure liquefied through application of a pressure of 56.5 atmospheres (=$5.72486 \times 10^6$ Pa) at a temperature of 20° C. to a colorless, highly volatile liquid. Methods for the pressure liquefaction of carbon dioxide are generally known.

One embodiment of the present invention relates to the production of foamed plastics, for example, by casting or extrusion methods. A different embodiment of the invention, which will be described later, relates particularly to the production of 1-component or 2-component polyurethane foams from pressurized containers (PUR=polyurethane). Initially, the first-named embodiment will be explained in greater detail in the following.

As further liquid components besides the pressure-liquefied carbon dioxide, all conventional liquid, physical blowing agents used for the production of foamed plastics, namely highly volatile organic compounds such as ethers, for example, diethyl ether, ketones such as acetone, hydrocarbons such as pentane, hexane, heptane, petroleum ether mixtures, halogen-containing hydrocarbons or halogen-containing ethers, can be used. Gases which have been liquefied under pressure, such as propane or butane, can also be used in addition to the liquefied carbon dioxide. Furthermore, water is a possible liquid blowing agent component.

Preferably, for producing foamed plastics, a blowing agent composition is used, which contains or consists of 10 to 20 parts by weight of liquefied carbon dioxide and 30 to 90 parts by weight of at least one liquid or pressure liquefied physical blowing agent selected from the group of alcohols with 1 to 5 carbon atoms, aliphatic hydrocarbons with 2 to 12 carbon atoms, cyclic hydrocarbons with 3 to 12 carbon atoms, halogen-containing hydrocarbons with 1 to 5 carbon atoms or halogen-containing ethers with a total of 2 to 6 carbon atoms. Ethanol and isopropanol, in particular, are preferred as alcohols. Examples of aliphatic hydrocarbons are pentane, hexane, heptane and petroleum ether fractions, especially light petroleum ether fractions with a boiling point in the range from 15° to 80° C. Furthermore, the low-boiling fractions, such as propane and/or butane, liquefied under pressure, can also be used in pressure liquefied form as liquid blowing agent components. Examples of cyclic hydrocarbons are cycloaliphatic hydrocarbons, preferably cyclopropane, cyclopentane and cyclohexane. Halogen-containing hydrocarbons include hydrogen-containing chlorofluorohydrocarbons or fluorohydrocarbons. As chlorofluorohydrocarbons, such materials as chlorodifluoromethane (R22), trifluoromethane (R23), 1,1-dichloro-1-fluoroethane (R141b), 1-chloro-1,1,-difluoroethane (R142b) or 1,3-dichloro-1,1,2,2,3,3,-hexafluoropropane (R216a) can be used. Examples of fluorohydrocarbons are pentafluoroethane (R125), 1,1,1,2-tetrafluoroethane (R134a), 1,1,1-trifluoroethane (R143a), 1,1,2-trifluoroethane (R143) 1,1-difluoroethane (R152a), 1,1,1,3,3-pentafluoropropane (R245fa), octafluoropropane (R218), or also 1,1,1,3,3-pentafluorobutane (R365mfc). Halogen-containing ethers are understood to be hydrogen-containing chlorofluoroethers or fluoroethers, such as difluoromethoxy-2,2,2-trifluoroethane (E245).

Preferably, a blowing agent composition is used, which contains or consists of a mixture of 10 to 20 parts by weight of liquefied carbon dioxide and 30 to 90 parts by weight of at least one halogen-containing hydrocarbon or an aliphatic hydrocarbon or a halogen-containing ether.

Particularly preferred for the inventive method is a blowing agent composition, which comprises or consists of 10 to 20 parts by weight of liquefied carbon dioxide and 30 to 90 parts by weight of 1,1,-difluoroethane (R152a) and/or 30 to 90 parts by weight of 1,1-dichloro-1-fluoroethane (R141b). Further particularly preferred blowing agent compositions used in the process of the invention are blowing agent compositions which comprise or consist of a mixture of 10 to 20 parts by weight of liquefied carbon dioxide and 80 to 90 parts by weight of 1,1-dichloro-1-fluoroethane (R141b), as well as optionally 1 to 3 parts by weight of water. Likewise, particularly preferred is a blowing agent composition, which comprises or consists of a mixture of 10 to 20 parts by weight of liquefied carbon dioxide, 50 to 70 parts by weight of 1,1-difluoroethane (R152a) and 20 to 35 parts by weight of ethanol. Among the inventive compositions containing halogen-containing ethers, those blowing agent compositions are particularly preferred, which comprise or consist of 10 to 20 parts by weight of liquefied carbon dioxide and 80 to 90 parts by weight of difluoromethoxy-2,2,2-trifluoroethane (E245). Of the aliphatic hydrocarbons, n-pentane is particularly preferred. Preferably, an inventive composition containing aliphatic hydrocarbons should comprise or consist of 10 to 20 parts by weight of liquefied carbon dioxide and 80 to 90 parts by weight of n-pentane, as well as optionally, 1 to 3 additional parts by weight of water.

In all these blowing agent mixtures, the amount of other blowing agents used can be reduced through the use of liquid carbon dioxide. $CO_2$ is physiologically unobjectionable and environmentally compatible.

Advantageously, the inventive method for producing foamed plastics is carried out as a casting or extrusion process. In the extrusion method, mixtures, suitable for the production of foamed plastics, are extruded directly as foamed panels, sheets, molded articles, profiles or particles. Particularly preferred is the production of thermoplastic materials, which are foamed pursuant to the invention, especially the production of polyethylene, polypropylene or polystyrene foams. In accordance with the invention, the method is carried out by mixing the blowing agent composition of liquefied carbon dioxide and a further physical liquid blowing agent into a melt of starting materials suitable for the production of the foamed plastics and conducting the polymerization of the starting materials for the foamed plastic, which is to be produced, optionally while maintaining a weak pressure or vacuum during the foaming process. Known processing equipment, such as extrusion equipment, can be used for the inventive method. In this connection, it is particularly surprising that it is possible using the method of the invention to introduce carbon dioxide in the liquefied state even at an elevated temperature into the extruder for the purpose of foaming thermoplastic polymer melts. In contrast to previously known methods of the prior art, a problem-free metering of the carbon dioxide is thus possible. Following the method of the invention it is possible using carbon dioxide to produce predominantly closed-cell foam materials having a very uniform, fine-celled structure. Furthermore, the foamed plastics produced by the method of the invention are distinguished by a high heat insulating capability.

The inventive method for producing foamed plastics can be carried out in such a manner, that a blowing agent composition, premixed in a pressure vessel, is used, which was prepared by transferring the liquid physical blowing agent or the physical blowing agent liquefied under pressure to a pressure vessel in the desired parts by weight and forcing in carbon dioxide, which has been liquefied under pressure, in the desired amount by a known method. The inventive method can, however, also be carried out by preparing the blowing agent composition, which is to be used, only immediately before subjecting the polymers or polymerizable components, which are to be foamed, to the foaming process. For this purpose, appropriate amounts of carbon dioxide, which is liquefied in a pressure vessel outside the actual extruding equipment, are introduced into the other liquid blowing agent components under a pressure, at which carbon dioxide is present in the liquid state, such that the components are substantially mixed. The resulting homogeneous mixture of liquefied carbon dioxide and liquid blowing agent components is then introduced through an inlet for liquid blowing agents into the extruder equipment.

The inventive method is suitable for producing open cell as well as closed cell rigid or flexible foams. The method is particularly suitable for producing foamed polyurethane plastics. For this purpose, known polyurethane processing equipment can be used, such as high- or low-pressure mixing equipment, which is equipped with static mixers known from the state of the art.

In one embodiment for producing foamed polyurethane plastics, the inventive blowing agents may contain, in addition to the pressure-liquefied carbon dioxide and one or more liquid and/or pressure-liquefiable physical blowing agents, further liquid additives, such as flame retardants, as an additional component. Conventional flame retardants are, for example, phosphate esters or phosphonates. Particularly well suited are appropriate phosphate esters or phosphonate esters, which contain three lower alkyl groups or three lower alkyl groups substituted with one or more halogen atoms. Lower alkyl groups preferably are $C_1$ to $C_4$ groups. Such compounds as tris-chloroisopropyl phosphate, trichloroisopropyl phosphate, tris-chloroethyl phosphate, trichloroethyl phosphate, trichloropropyl phosphate, tris-chloropropyl phosphate, triethyl phosphate, dimethyl ethyl phosphate, tris-dichloroisopropyl phosphate or dimethyl methyl phosphonate are suitable.

If the inventive method is used for the production of foamed polyurethane plastics, all conventional raw materials for the foam can be used, such as aliphatic, cycloaliphatic or aromatic diisocyanates or polyisocyanates. Examples of foam raw materials include, for example, 2,4- and 2,6-toluene diisocyanate, diphenylmethane diisocyanate, polymethylene polyphenyl isocyanate and mixtures thereof. Polyisocyanates containing carbodiimide groups, urethane groups, allophanate groups, isocyanurate groups, urea groups or biuret groups, which are referred to as "modified polyisocyanates" or "isocyanate prepolymers", can also be used. For the production of foamed polyurethane plastics, polyisocyanates are usually reacted with compounds, which contain at least two hydrogen atoms capable of reacting with isocyanate groups, such as compounds having hydroxyl groups and based on polyesters, polyethers and amines, as well as compounds having amino and/or carboxyl and/or thiol groups. Furthermore, it is possible to use all catalysts used for the production of foamed polyurethane plastics, such as tertiary amines and/or organometallic compounds, such as tin salts of carboxylic acids.

If the inventive method is used for the production of polystyrene or polyethylene foams, all foam raw materials, known for this purpose, can be used.

In addition to the polymers and/or the polymerizable components, all known additives or auxiliaries can be added in a known manner, such as nucleating agents, pore regulators, flame retardants, anti-static agents, stabilizers, plasticizers, cross-linking agents, fillers or dyes.

A further embodiment of the invention relates to the production of 1-component or multi-component polyurethane foams from pressure vessels and is explained in the following. Here also, a blowing agent composition is used, which contains 0.5% to 50% by weight of liquefied carbon dioxide.

The blowing agent composition is understood to comprise the liquid portion of the blowing agent enclosed in the pressure vessel, including the gas phase present in the pressure vessel.

Besides the liquid $CO_2$, the blowing agent composition in this embodiment contains at least one further liquid component. A liquid or pressure-liquefied physical blowing agent, for example, may be contained as the further liquid component. Halogen-containing blowing agents are very suitable; halogen-free blowing agents frequently are compatible with the environment and are to be preferred. According to a particularly advantageous embodiment, liquid $CO_2$ is contained as only blowing agent; the other liquid components are constituted by a liquid flame retardant from the group of esters of phosphoric acid or esters of phosphonic acid.

As other liquid components besides the pressure-liquefied carbon dioxide, all conventional liquid physical blowing agents, namely highly volatile organic compounds such as ethers, acetone, hydrocarbons such as pentane, heptane, hexane, petroleum ether mixtures, halogen-containing hydrocarbons or halogen-containing ethers are possible. Gases, which have been liquefied under pressure, such as propane or butane, can also be used in addition to the liquefied carbon dioxide.

Preferably, the inventive blowing agent compositions contain more than 5 wt.-%, in particular 5 to 50 wt.-%, for example 5 or 10 to 30 wt.-% of liquefied carbon dioxide.

Preferred are blowing agent compositions, which contain or consist of a mixture of 10 to 50 parts by weight of liquefied carbon dioxide and 30 to 90 parts by weight of at least one liquid or pressure liquefied blowing agent selected from the group of ethers with a total of 2 to 4 carbon atoms, ketones with 3 to 5 carbon atoms, aliphatic hydrocarbons with 2 to 12 carbon atoms, halogen-containing hydrocarbons with 1 to 5 carbon atoms or halogen-containing ethers with a total of 2 to 6 carbon atoms. Examples of aliphatic hydrocarbons are pentane, hexane, heptane, as well as petroleum ether fractions, particularly naphtha with a boiling point in the range from 15 to 80° C. Preferably the low-boiling fractions, such as propane and/or butane, are used in a pressure-liquefied form. Examples of cyclic hydrocarbons are cyclopropane, cyclopentane and cyclohexane. Halogen-containing hydrocarbons are defined as hydrogen-containing chlorofluorohydrocarbons or fluorohydrocarbons. As chlorofluorohydrocarbons, such materials as chlorodifluoromethane (R22), 1,1-dichloro-1-fluoroethane (R141b), 1-chloro-1,1-difluoroethane (R142b) or 1,3-dichloro-1,1,2,2,3,3,-hexafluoropropane (R216a) are possible. Examples of fluorohydrocarbons are trifluoromethane (R23), pentafluoroethane (R125), 1,1,1,2-tetrafluoroethane (R134a), 1,1,1-trifluoroethane (R143a), 1,1,2-trifluoroethane (R143), 1,1-difluoroethane (R152a), 1,1,1,3,3-pentafluoropropane (R245fa), octafluoropropane (R218) or 1,1,1,3,3-pentafluorobutane (R365mfc). Halogen-containing ethers are defined as hydrogen-containing chlorofluoroethers or fluoroethers, such as difluoromethoxy-2,2,2-trifluoroethane (E245). Examples of possible ethers are dimethyl ether or diethyl ether. Of the ketones, acetone is particularly preferred.

The inventive blowing agent compositions can be free of halogenated blowing agents and consist only of liquefied carbon dioxide as sole blowing agent component. Preferred are mixtures, which contain or consist of liquefied carbon dioxide in an amount of 20 to 30 parts by weight and butane or a propane/butane mixture in an amount of 50 to 60 parts by weight and/or acetone in an amount of 5 to 15 parts by weight. As propane/butane mixture, a usual mixture can be used, for example, a mixture with a vapor pressure of about 3.7 bar (abs.).

Furthermore preferred are inventive blowing agent compositions, which contain or consist of 10 to 50 parts by weight of liquefied carbon dioxide and 10 to 90 parts by weight of a halogen-containing hydrocarbon or a halogen-containing ether. Particularly preferred are blowing agent compositions, which contain or consist of 10 to 30 parts by weight of liquefied carbon dioxide and 10 to 90 parts by weight of the halogen-containing hydrocarbons 1,1-difluoroethane (R152a) and/or 1,1-dichloro-1-fluoroethane (R141b). Of the inventive compositions containing halogen-containing ethers, those blowing agent compositions are particularly preferred which contain 15 to 40 parts by weight of liquefied carbon dioxide and 10 to 20 parts by weight of difluoromethoxy-2,2,2-trifluoroethane (E245).

In another particularly preferred embodiment, the inventive blowing agents can contain as liquid components in addition to the pressure-liquefied carbon dioxide, phosphate esters or phosphonates useful as flame retardants. Particularly well suited are phosphate or phosphonate esters which contain three C1 to C4 alkyl groups, which optionally are substituted by one or more halogen atoms, such as tris-chloroisopropyl phosphate, tris-chloroethyl phosphate, trichloroethyl phosphate, trichloropropyl phosphate, tris-chloropropyl phosphate, triethyl phosphate, dimethyl ethyl phosphate, tris-dichloroisopropyl phosphate or dimethyl methyl phosphonate. Advantageously, the concentrations are 10 to 50 parts by weight of liquefied carbon dioxide and 80 to 100 parts by weight of phosphate ester or phosphonate. Preferably, tris-chloropropyl phosphate is used. These particularly preferred blowing agent compositions are free of blowing agents other than carbon dioxide and are therefore particularly compatible with the environment.

The inventive blowing agent compositions are suitable for producing all hitherto known polyurethane foams from pressure vessels, especially for foaming 1-component and 2-component polyurethane foams. The inventive blowing agent compositions can also be used for the production of multi-component polyurethane foams, for which the foam-forming agents with more than one reactive component are filled separately into pressure vessels. The inventive blowing agent compositions can even be used for the production of so-called 1.5-component polyurethane foams, in which, in contrast to 2-component foams, a polyol component in an amount insufficient for reacting the isocyanate groups, is added to the prepolymer shortly before ejection.

The inventive blowing agent compositions have proved to be very advantageous for the production of 1-component or 2-component polyurethane foams materials.

The 1-component polyurethane foam mixture, which is to be foamed, may contain, in a known manner, a polyol component, a polyisocyanate component, a catalyst as well as, optionally, a flame retardant as an auxiliary material as further components besides the inventive blowing agent composition.

As polyol components, for example, glycerin, glycols or polyether polyols, which were obtained as addition products of propylene oxide or ethylene oxide to polyhydric alcohols, water or ethylenediamine, or polyester polyols, which were obtained as polycondensation products of polyols with dicarboxylic acids or their anhydrides, or mixtures thereof may be contained in the 1-component polyurethane foam mixture. A typical foam component can, for example, be a mixture of a brominated polyether polyol (for example a diol or triol) with a hydroxyl number of 200 to 350 and a polyether polyol (for example a diol) with a hydroxyl number of 110. Furthermore, modified vegetable oils with an OH number ranging from 100 to 300, such as castor oil, are also possible As polyisocyanate components, for example, diphenylmethane-4,4'-diisocyanate, diisocyanato-toluene, 1,5-diisocyanato-naphthalene, triisocynato-triphenylmethane, 1,6-diisocyanato-hexane, preferably diphenylmethane-4,4'-diisocyanate, or mixtures thereof can be used.

Typical catalysts in 1-component polyurethane foam mixtures, which can be foamed in the inventive method with an inventive blowing agent composition, are organic amines, aminoalcohols or aminoethers, such as 2-dimethylaminoethyl-3-dimethylaminopropyl ether, diethanolamine, dimethylcyclohexylamine, 2-dimethylaminoethyl ether, or morpholine compounds, such as 2,2-dimorpholinodiethyl ether, N,N-dimethylaminoethylmorpholine and N-methylmorpholine. Morpholine compounds, particularly 2,2-dimorpholinodiethyl ether, are preferred.

As conventional flame retardants, tris-chloroisopropyl phosphate, trichloroisopropyl phosphate, tris-chloroethyl phosphate, trichloroethyl phosphate, tris-chloropropyl phosphate, trichloropropyl phosphate, dimethyl ethyl phosphate, tris-dichloroisopropyl phosphate, dimethyl methyl phosphonate, dimethylene ethyl phosphate and preferably tris-chloropropyl phosphate, can be used.

Siloxane copolymers, for example, are suitable as stabilizers.

Based on the foam mixture as 100% by weight, a 1-component polyurethane foam mixture contains, for example, 20% to 30% by weight of a polyol component, 40% to 60% by weight of a polyisocyanate component, 0.1% to 3% by weight of catalyst, optionally 10% to 15% of a flame retardant, optionally 1 to 2% by weight of a foam stabilizer, besides 15% to 35% by weight of an inventive blowing agent composition. A typical 1-component polyurethane foam mixture, which can be foamed advantageously with the help of the inventive blowing agent composition, thus consists, for example, of about 22.5% by weight of a polyol component, for example a mixture of a brominated polyether polyol with a hydroxyl number of 200 to 350 and a polyether polyol with a hydroxyl number of 110, mixed in a ratio of 1:1, approximately 42.5% by weight of a polyisocyanate component, such as diphenylmethane-4,4,'-diisocyanate, approximately 0.5% by weight of a catalyst substance, such as 2,2-dimorpholinodiethyl ether, approximately 1.5% by weight of a silicone foam stabilizer, approximately 13% by weight of a flame retardant, such as tris-chloropropyl phosphate, and approximately 20% by weight of an inventive blowing agent composition. From such a 1-component polyurethane foam mixture, a 1-component foam can be prepared with a uniform, fine-celled structure and a low bulk density, for example a bulk density of about 23 to 25 kg/m$^3$.

The 1.5-component and 2-component polyurethane foams differ from the 1-component foams in that the polyol component required for the curing of the foam is kept separately from the prepolymer composition in the pressure vessel and is added to the prepolymer only immediately before the foaming. Possible second components include all the previously mentioned polyol components. For more rapid curing, the second component may additionally contain a conventional catalyst, such as the previously mentioned amine or morpholine compounds or also organometallic compounds, such as tin dioctoate, cobalt naphthenate, dibutyl tin dilaurate or iron acetonyl acetate.

One-component or multi-component polyurethane foams, produced with the inventive blowing agent compositions, exhibit very good heat insulating capabilities and are therefore suitable for insulating purposes, for example, in construction or in residences. The inventive blowing agents are also suitable for the production of spray adhesives based on polyurethane.

Furthermore, the invention comprises a method for producing a 1-component or 2-component polyurethane foam, in which a polyurethane foam is produced from a pressure vessel, which contains a polyurethane foam mixture of a polyol component, a prepolymer containing isocyanate groups, a catalyst and optionally further conventional auxiliaries, as well as one of the above-described blowing agent compositions, by relieving the pressure existing in the pressure vessel to atmospheric pressure through a valve. Appropriate pressure vessels as well as valves, suitable for the foaming, are generally known.

Furthermore, the invention relates to 1-component or multi-component polyurethane foam mixtures for producing a polyurethane foam from pressure vessels, which contain one of the blowing agent compositions described above.

The invention also relates to a method for producing a blowing agent composition for generating polyurethane foams from pressure vessels, in which liquefied carbon dioxide is used as a blowing agent component. In the method of the invention, the liquid or pressure-liquefied physical blowing agent component is introduced in the desired proportions by weight into a pressure vessel, and carbon dioxide liquefied by known means, usually by pressure, is forced into the vessel in the desired amount. This inventively produced blowing agent composition can subsequently be injected in the desired amount into a pressure vessel (aerosol can), which already contains the prepolymer and optionally all other components. The amount of carbon dioxide is limited only by the pressure permitted for aerosol cans (10 to 18 bar).

Pursuant to the invention, it is now possible to produce pressure vessels containing polyurethane foam mixtures which may contain about 20 to 30 g of carbon dioxide per 1 kg can. According to previously used methods, for which carbon dioxide was always used in gaseous form, it was possible to introduce only about 3 to 5 g of carbon dioxide per 1 kg can. In accordance with the invention, it is now possible in an advantageous manner in the production of polyurethane foam materials from pressure containers, to decrease further the proportion of combustible, physical, liquid or pressure-liquefied blowing agents. From the point of view of cost, decreasing the amount of previously customary liquid or pressure-liquefied, physical blowing agent is also extremely advantageous. 1-Component or multi-component polyurethane foams produced with the inventive blowing agent compositions, have a predominantly closed-cell structure with a very uniform fine celled structure, as well as a very high thermal insulating capability. Accordingly, polyurethane foams produced with a blowing agent composition according to the invention, are particularly well suited for insulating purposes in construction and residences.

The following examples are intended to explain the invention in greater detail without, however, limiting its scope.

EXAMPLES

1. Production of a Polystyrene Foam a) Liquefied Carbon Dioxide/R152a as Blowing Agent 200 kg of polystyrene (melt index 3.0–110) was mixed with 2 kg of talcum as a nucleating agent, and this mixture was metered into a conventional extrusion device and melted. About 6% by weight, relative to the polystyrene, of a blowing agent according to the invention was metered through an injection nozzle into the polystyrene melt in the melt zone of the extruder. The inventive blowing agent composition contained 14 parts by weight of liquefied carbon dioxide and 86 parts by weight of R152a. The vapor pressure of this blowing agent composition was about 14 bar at 20° C.

In the mixing zone, the polystyrene melt was homogeneously mixed with the inventive blowing agent composition, and the resulting mixture was subsequently extruded through a nozzle. A closed-cell foam with a uniform, fine-celled structure was obtained.

Polystyrene foam sheets as well as polystyrene foam panels were produced pursuant to the invention. A polystyrene foam sheet produced according to the invention had a density of about 35 kg/m$^3$; a polystyrene foam panel produced according to the invention had a density of about 33 kg/m$^3$.

b) Liquefied Carbon Dioxide/R152a/Ethanol as Blowing Agent

As described for Example 1 a), about 8.5% by weight of an inventive blowing agent, based on the polystyrene, was metered into a polystyrene melt. The inventive blowing agent composition contained 14 parts by weight of liquefied carbon dioxide, 57 parts by weight of R152a and 29 parts by weight of ethanol. The vapor pressure of these blowing agent compositions was about 15 bar at 20° C. A polystyrene foam sheet produced according to the invention had a density of about 36 kg/m$^3$; a foam panel produced according to the invention had a density of about 34 kg/m$^3$.

2. Production of a Polyethylene Foam a) Liquefied Carbon Dioxide/R152a/R141b as Blowing Agent 200 g of polyethylene (melt index 3.5–150) was extruded under the same conditions described in Example 1 for polystyrene foam. Approximately 6% by weight of a blowing agent mixture, based on the polyethylene, was metered in. In accordance with the invention, a blowing agent composition of 14 parts by weight of liquefied carbon dioxide, 50 parts by weight of R152a and 36 parts by weight of R141b was used. A fine-celled polyethylene foam with low shrinkage was obtained. The polyethylene foam pipe produced according to the invention had a density of about 40 kg/m$^3$.

3. Production of a Polyurethane Foam

To produce the polyurethane foam, a polyol mixture composed of 40 parts by weight of an ethylenediamine/propylene oxide polyether (OH number 480), 60 parts by weight of a sorbitol/glycerin/propylene oxide polyether (OH number 490), 1 part by weight of a foam stabilizer (type DC193 from Dow Corning Corporation) and 1.5 parts by weight of dimethylcyclohexyl amine was used as one of the starting components. Diphenylmethane diisocyanate in an amount 10% by weight above the stoichiometric amount was used as the isocyanate component. The polyurethane foams were produced in a low-pressure apparatus, which had an output of about 8 kg/min and with which metering of 3 components is possible. A static mixer was used for the mixing.

a) Liquefied Carbon Dioxide/R141b/Water as Blowing Agent

Pursuant to the invention, a blowing agent composition was used in an amount of 30 parts by weight. The blowing agent composition consisted of 13.9 parts by weight of liquefied carbon dioxide, 85.1 parts by weight of R141b and additionally 1 part by weight of water. With this inventive blowing agent composition a rigid polyurethane foam was produced with a fine-cell structure and a density of about 24 kg/m$^3$.

b) Liquefied Carbon Dioxide/n-Pentane/Water as Blowing Agent

Furthermore, a polyurethane foam was produced with 18 parts by weight of a blowing agent composition. Pursuant to the invention, this blowing agent composition consisted of 13.9 parts by weight liquefied carbon dioxide and 85.1 parts by weight n-pentane and, additionally, 1 part by weight of water. With this blowing agent composition, a rigid polyurethane foam was obtained with a fine-cell structure and a density of about 25.4 kg/m$^3$.

c) Liquefied Carbon Dioxide/E245 as Blowing Agent

Furthermore, a polyurethane foam was produced with 35 parts by weight of a blowing agent composition. In accordance with the invention, this blowing agent composition consisted of 14 parts by weight of liquefied carbon dioxide and 85 parts by weight of E245. With this blowing agent composition, a rigid polyurethane foam was obtained with a fine-cell structure and a density of about 33.5 kg/m$^3$.

4. Liquefied Carbon Dioxide/Propane/Butane/Acetone as Blowing Agent for 1-Component Polyurethane Foams a)
247 g of a polyol premix composed of
73 g polyether polyol (diol), brominated, hydroxyl number about 240,
73 g polyether polyol (diol), OH number about 110,
89 g tris-chloropropyl phosphate,
5 g silicone foam stabilizer,
7 g dimorpholine diethyl ether,
was filled into an aluminum aerosol can having a volume of 1,000 cm$^3$. 365 g of diphenylmethane-4,4-diisocyanate was added, and the aerosol can was closed off with a foam aerosol valve. An inventive blowing agent composition was prepared by introducing 62 g of pressure-liquefied propane/butane and 10 g of acetone into a pressure vessel and then adding 28 g of pressure-liquefied carbon dioxide with mixing. 99 g of this inventive blowing agent composition was then injected through a conventional aerosol filling device into the aerosol can containing the foam components. The aerosol can was shaken briefly and allowed to stand for about 24 hours to form the prepolymer. At the end of this time, the 1-component polyurethane foam mixture was ready for use.

The 1-component polyurethane foam mixture was expelled from the aerosol can by means of the inventive blowing agent composition. A polyurethane foam was obtained with a bulk density of approximately 23 kg/m$^3$, having a uniform, fine-cell structure. The shrinkage of the polyurethane foam after storage for 7 days at a humidity of about 90% averaged about 5% by length.

b) As described under a), a polyol mixture and a polyisocyanate were filled into an aerosol can of similar volume. As blowing agent composition according to the invention, a composition of 50 g propane/butane, 7.5 g acetone and 20 g liquefied carbon dioxide was used. The production of the blowing agent composition and the filling of the aerosol can were carried out as described under a).

The polyurethane foam produced with this blowing agent composition according to the invention, had a raw bulk density of about 25 kg/m$^3$.

5. Liquefied Carbon Dioxide/Propane/Butane/R141b as Blowing Agent for 1-Component Polyurethane Foams A polyol mixture and a polyisocyanate were filled as described in Example 4, into an aerosol can with a volume of 1,000 cm$^3$. As blowing agent composition according to the invention, a composition of 62 g propane/butane, 10 g R141b and 28 g liquefied carbon dioxide was used. The blowing agent composition was produced and filled into the aerosol can as described in Example 4.

The polyurethane foam produced with this blowing agent composition according to the invention, had a raw bulk density of about 25 kg/m$^3$.

6. Liquefied Carbon Dioxide/Trichloropropyl Phosphate/R141b as Blowing Agent for 1-Component Polyurethane Foams 214 g of a polyol mixture and 356 g of polyisocyanate were filled, as described in Example 4, into an aerosol can with a volume of 1,000 cm$^3$. A composition according to the invention was prepared by placing 100 g of tris-chloropropyl phosphate and 10 g of R141b in a pressure vessel and adding 28 g of pressure-liquefied carbon dioxide with mixing. 99 g of this blowing agent composition were filled into the aerosol can, as described in Example 4.

What is claimed is:

1. A blowing composition for producing foamed plastics or for producing one-component or two-component polyurethane foams from pressure-vessels, said composition consisting of a mixture of:
    5 to 20% by weight of liquid carbon dioxide; and
    at least one other liquid or pressure-liquified component selected from the group consisting of ethers with a total of 2 to 4 carbon atoms; fluorohydrocarbons selected from the group consisting of 1,1,1-trifluoroethane, 1,1,2-trifluoroethane, 1,1,1,3,3-pentafluoropropane and 1,1,1,3,3-pentafluorobutane.

2. A method for the production of a one-component or two-component polyurethane foam, said method comprising discharging a pressurized mixture from a pressure vessel through a valve, said pressurized mixture comprising:
    a polyurethane prepolymer having isocyanate groups; and
    a blowing agent composition consisting of a mixture of:
        5 to 50% by weight of liquid carbon dioxide; and
        at least one other liquid or pressure-liquified component selected from the group consisting of ethers with a total of 2 to 4 carbon atoms; ketones with 3 to 5 carbon atoms; alcohols with 1 to 5 carbon atoms; aliphatic hydrocarbons selected from the group consisting of propane, butane, pentane, hexane, heptane; cyclic hydrocarbons with 3 to 12 carbon atoms; fluorohydrocarbons selected from the group consisting of trifluoromethane, 1,1,1-trifluoroethane, 1,1,2-trifluoroethane, 1,1,1,3,3-pentafluoropropane and 1,1,1,3,3-pentafluorobutane.

3. A composition for producing a one-component or two-component polyurethane foam, said composition comprising:
    a polyurethane prepolymer; and
    a blowing agent composition consisting of a mixture of:
        5 to 50% by weight of liquid carbon dioxide; and
        at least one other liquid or pressure-liquified component selected from the group consisting of ethers with a total of 2 to 4 carbon atoms; ketones with 3 to 5 carbon atoms; alcohols with 1 to 5 carbon atoms; aliphatic hydrocarbons selected from the group consisting of propane, butane, pentane, hexane, heptane; cyclic hydrocarbons with 3 to 12 carbon atoms; fluorohydrocarbons selected from the group consisting of trifluoromethane, 1,1,1-trifluoroethane, 1,1,2-trifluoroethane, 1,1,1,3,3-pentafluoropropane and 1,1,1,3,3-pentafluorobutane.

4. A device for producing a one-component or two-component polyurethane foam, said device comprising:
    a pressure vessel containing a pressurized mixture comprising an isocyanate group containing polyurethane prepolymer and a blowing agent composition, said blowing agent composition consisting of a mixture of:
        5 to 50% by weight of liquid carbon dioxide; and
        at least one other liquid or pressure-liquified component selected from the group consisting of ethers with a total of 2 to 4 carbon atoms; ketones with 3 to 5 carbon atoms; alcohols with 1 to 5 carbon atoms; aliphatic hydrocarbons selected from the group consisting of propane, butane, pentane, hexane, heptane; cyclic hydrocarbons with 3 to 12 carbon atoms; fluorohydrocarbons selected from the group consisting of trifluoromethane, 1,1,1-trifluoroethane, 1,1,2-trifluoroethane, 1,1,1,3,3-pentafluoropropane and 1,1,1,3,3-pentafluorobutane,
    said pressure vessel having a valve for releasing the contents or the vessel.

5. A method for the production of a one-component or two-component polyurethane foam, said method comprising discharging a pressurized mixture from a pressure vessel through a valve, said pressurized mixture comprising a polyurethane prepolymer having isocyanate groups and a blowing agent composition according to claim 1.

6. A method according to claim 5, wherein the blowing agent composition contains from 5 to 40% by weight of the total mixture of prepolymer and blowing agent composition.

7. A composition for producing a one-component or two-component polyurethane foam, said composition comprising a polyurethane prepolymer and blowing agent according to claim 1.

8. A device for producing a one-component or two-component polyurethane foam, said device comprising a pressure vessel containing a pressurized mixture comprising an isocyanate group-containing polyurethane prepolymer and a blowing agent composition according to claim 1, said pressure vessel having a valve for releasing the contents of the vessel.

9. A blowing composition according to claim 1, wherein a remainder to 100 wt. % of the blowing composition is the at least one other liquid or pressure-liquified component.

10. A method according to claim 2, wherein said one-component or two-component polyurethane foam is a closed cell foam.

11. A blowing agent composition according to claim 1, wherein said composition contains 10 to 20% by weight of liquefied carbon dioxide.

12. A blowing agent composition according to claim 1, wherein said composition contains 10 to 20 parts by weight of liquefied carbon dioxide and 80 to 90 parts by weight of at least one liquid or pressure-liquefied physical blowing agent.

13. A method of producing a foamed plastic with the aid of a blowing agent, wherein the blowing agent is a liquid composition according to claim 1, which contains 5 to 20% by weight of liquefied carbon dioxide.

14. A method according to claim 13, wherein the blowing agent composition contains 10 to 20 parts by weight of liquefied carbon dioxide and 80 to 90 parts by weight of at least one liquid or pressure-liquefied blowing agent.

15. A method according to claim 13, wherein the foamed plastic is selected from the group consisting of foamed polyethylene, foamed polystyrene and foamed polyurethane.

16. A method according to claim 2, wherein the blowing agent composition comprises from 5 to 40% by weight of the total mixture of prepolymer and blowing agent composition.

17. A method for the production of a blowing agent composition according to claim 1, said method comprising admixing pressure-liquefied carbon dioxide with at least one further component which is a liquid or has been liquefied under pressure, so that the blowing agent composition contains 5 to 20% by weight of liquid carbon dioxide.

18. A method according to claim 17, wherein said at least one further component is a blowing agent.

\* \* \* \* \*